United States Patent
Simbirski et al.

(10) Patent No.: US 6,895,014 B2
(45) Date of Patent: May 17, 2005

(54) POLLING USING MULTIPLE DYNAMICALLY UPDATED LISTS

(75) Inventors: Walter Simbirski, Calgary (CA); Dusty Keashly, Irricana (CA); Joseph Robert Brasic, Calgary (CA); Daniel Cameron Taylor, Calgary (CA); Braden Stuart Marr, Calgary (CA); Lisa Anne Ryan, Calgary (CA)

(73) Assignee: Wave Rider Communications Inc., Toronto (CA)

( * ) Notice: Subject to any disclaimer, the term of this patent is extended or adjusted under 35 U.S.C. 154(b) by 605 days.

(21) Appl. No.: 09/933,134

(22) Filed: Aug. 21, 2001

(65) Prior Publication Data

US 2003/0023409 A1 Jan. 30, 2003

(51) Int. Cl.$^7$ ................................................ H04L 12/56
(52) U.S. Cl. ....................................................... 370/426
(58) Field of Search .............................. 370/346, 350, 370/449, 450, 458, 459

(56) References Cited

U.S. PATENT DOCUMENTS

| | | |
|---|---|---|
| 4,251,865 A | 2/1981 | Moore et al. |
| 4,466,001 A | 8/1984 | Moore et al. |
| 4,683,531 A | 7/1987 | Kelch et al. |
| 4,742,512 A | 5/1988 | Akashi et al. |
| 4,829,297 A | 5/1989 | Ilg et al. |
| 4,940,974 A | 7/1990 | Sojka |
| 5,297,144 A | 3/1994 | Gilbert et al. |
| 5,384,777 A | 1/1995 | Ahmadi et al. |
| 5,430,732 A | 7/1995 | Lee et al. |
| 5,577,043 A | 11/1996 | Guo et al. |
| 5,677,909 A | 10/1997 | Heide |
| 5,793,307 A | 8/1998 | Perreault et al. |
| 5,815,660 A | 9/1998 | Momona |
| 5,973,609 A | 10/1999 | Schoch |
| 6,006,017 A | 12/1999 | Joshi et al. |
| 6,049,549 A | 4/2000 | Ganz et al. |
| 6,114,968 A | 9/2000 | Ramakrishnan et al. |
| 6,173,323 B1 | 1/2001 | Moghe |

FOREIGN PATENT DOCUMENTS

| | | |
|---|---|---|
| EP | 0 589 509 A2 | 9/1993 |
| EP | 0 858 187 A1 | 8/1998 |
| EP | 2 765 429 | 12/1998 |
| GB | 2 225 690 A | 6/1990 |
| JP | 56128048 | 7/1981 |
| WO | 89/03145 | 4/1989 |

*Primary Examiner*—Wellington Chin
*Assistant Examiner*—William Schultz
(74) *Attorney, Agent, or Firm*—Bennett Jones LLP

(57) ABSTRACT

A method for polling a plurality of wireless modems from a base station in which the base station individually polls all of the modems and forms at least two lists such that each modem is identified on only one discrete list based upon its behavior in response to the polling. Thereafter, the modems identified on each discrete list are polled at a rate that may differ from the rate at which the modems identified on any other list are polled and the lists are updated dynamically based upon the behavior of the modems polled in response to the last polling.

16 Claims, 14 Drawing Sheets

POLLING USING MULTIPLE DYNAMICALLY UPDATED LISTS

FIELD

This invention relates generally to the field of network management and in particular to a method for efficient polling of wireless modems.

BACKGROUND

A wireless modem is a data communication device that comprises at least two data communication ports, at least one of which is a wireless data port enabling the wireless modem to communicate with one or more other wireless modems via a radio frequency ("RF") link. The other communication ports, each of the other communication ports may be connected to a single computer or a data network, may be wire line, such as Ethernet, USB, or RS232, or wireless. To simplify the following description, we will consider a wireless modem to have two communication ports—one an RF link for communicating with other wireless modems and the other a wire line link for communication with a single computer or a data network. Ethernet will be used as exemplary protocol for the wire line link in the following discussion. Wireless modems are typically used to link together wire line data networks that are geographically separated. The wireless modems in that case act as bridges between the wire line data networks. An example of such use is shown in FIG. 1. A first local area network 10 is connected by wire line 12 to a first wireless modem 14. Similarly a second local area network 16 is connected by wire line 18 to a second wireless modem 20. The two wireless modems 14, 20 communicate via an RF link 22, shown connecting wireless modem 14 with wireless modem 20 through the free space separating the modems 14, 20.

In order for wireless modems to be used in a variety of data networks supporting different communication protocols, and to facilitate efficient operation on their RF links, wireless modems typically use protocol layering. Regardless of the protocol used on the wired link, when a data packet is received by a wireless modem on its wired link and is to be transmitted on its RF link, the wireless modem encapsulates the wire line data packet within an RF packet containing information specific to the RF link. In essence the wire line data packet becomes the data payload for the RF data packet. The wireless modem then sends the complete RF packet on its RF link. The wireless modem that receives the packet removes the RF link specific information and then forwards the wire line portion of the packet on its wire line communication port.

A typical RF link packet 24 that would be transmitted from wireless modem 14 to wireless modem 20 in FIG. 1 using protocol layering is shown in FIG. 2. The data contained in RF link packet 24 includes:

Synch Sequence 26—data that precedes the rest of RF link packet 20 and allows any wireless modem receiving RF link packet 24 to synchronize on the incoming data and determine where the start of the remaining data is in the packet 40.

SRC 28—an address or unique identifier of the wireless modem ("the source modem") that transmitted RF link packet 24, in this case wireless modem 14. All wireless modems have a unique address or identifier permanently written into them during manufacture.

DEST 30—an address or unique identifier of the wireless modem ("the destination modem") that is expected to receive RF link packet 24. Since RF is a broadcast medium all wireless modems in the receiving area will receive the RF link packet 24. Only the wireless modem that has an SRC 28 that matches the DEST 30, in this case wireless modem 20, is expected to process RF link packet 24. All other wireless modems receiving RF link packet 24 are expected to discard it.

CONTROL 32—special control data for the destination wireless modem, in this case wireless modem 20. The control data may include an indication that the data payload (see below) is actually intended for the destination wireless modem, here wireless modem 20, and is not to be forwarded on to its associated local area network, here local area network 16. Other control data may indicate that additional data packets will be following or that no acknowledgement is expected in response to RF link packet 24.

ID 34—a unique identifier associated with RF link packet 24. Each time the source wireless modem transmits a packet on its RF link it increments the ID of the previous packet so that each transmitted RF link packet 24 is uniquely identified.

ACK ID 36—the ID of the last uncorrupted packet that the source wireless modem received from the destination modem.

PAYLOAD 38—the data portion of the RF link packet 24.

FCS 40—the frame check sequence. This is a value that is calculated from all of the data in the RF link packet 24, excluding the synch sequence 26 and the FCS 40. The destination modem, here wireless modem 20 recalculates the FCS 40 based on the data it receives. If the calculated value matches the value of the received FCS 40, then the payload 40 is forwarded on the wired link, in this case wire line 18, and the ID of the RF link packet 24 is stored to be used as the ACK ID 36 when next communicating with the source modem. If the calculated value of the FCS 40 does not match the value of the received FCS 40, then the RF link packet 24 is discarded without attempting to notify the source modem.

Wireless modems are also used in point to multi-point wireless data communication networks, such as that shown in FIG. 3 and indicated generally by reference numeral 42. In point to multi-point wireless data communication network 42, a special form of wireless modem, base station 44, is connected by wire line 45 to a data network 43. Base station 44 receives data from data network 43 and transmits it to a group of wireless modems, a representative four of which are indicated by reference numerals 46, 48, 50, and 52 in FIG. 3, via RF links 54, 56, 58, 60, respectively. The wireless modems 46, 48, 50, 52 in turn send data via RF links 54, 56, 58, 60, respectively, directly to with the base station 44 (i.e., wireless modems 46, 48, 50, 52 do not communicate directly with each other). One common application of a point to multi-point wireless data communication network 42 is to connect a group of end users, each with one or more wireless modems 46, 48, 50, 52, to the Internet (an example of a data network 43) via the base station 44, which is maintained by an Internet Service Provider (ISP). The point to multi-point wireless data communication network 42 allows the ISP to provide Internet connectivity to its customers in a geographic area in a timely and cost efficient manner.

The base station 44 and its associated group of wireless modems 46, 48, 50, 52 all transmit data on the same RF frequency (RF channel). Only one of the base station 44 and its associated group of wireless modems 46, 48, 50, 52 can be transmitting data at a particular time in a geographic area. If more than one of wireless modems 46, 48, 50, 52 attempts to transmit data simultaneously, then all transmissions will be corrupted, i.e., they will interfere with each other, and the base station 44 will not be able to decipher any of the transmissions. In order to prevent communications from multiple modems from interfering with each other some method of coordinating access to the RF channel is required. For example, RF links 54, 56, 58, and 60 shown in FIG. 3 all share the same RF channel, but only one of them can be active at a time if interference is to be avoided.

Access to an RF channel can be coordinated if the base station or a wireless modem wishing to transmit data on the RF channel first listens to determine if any of the wireless modems, in the case of the base station, or the base station or any of the other wireless modems, in the case of a wireless modem, are currently transmitting. While wireless modems do not communicate directly with each other they are able to determine if another wireless modem, or the base station, is currently transmitting. When neither the base station nor any of the other wireless modems are transmitting, then the RF channel is available and data can be transmitted. This technique is commonly referred to as "collision-sense multiple access with collision avoidance" ("CSMA/CA") and is illustrated in FIG. 4, which shows a portion of network 42. In FIG. 4, wireless modem 52 has data that it wishes to send to base station 44. However, at the same time, wireless modem 46 is already sending data over RF link 54, which uses the same RF channel that wireless modem 52 would have to use to send data to base station 44. Wireless modem 52 monitors the RF channel, so if it is able to receive the RF signal being broadcast by wireless modem 46, it waits until wireless modem 46 stops sending data to base station 44 before it attempt to send its data. The RF signal received by wireless modem 52 is indicated by reference numeral 62. While the RF signal broadcast by wireless modem 46 may radiate in directions, only RF link 54 and RF signal 62 are shown in FIG. 4.

One of the difficulties with the CSMA/CA technique is that it is possible for two or more wireless modems wishing to send data at the same time to simultaneously sense that the RF channel is free and to begin transmitting at the same time. This is referred to as a collision and results in both transmissions becoming corrupted. Collisions can also occur due to "hidden nodes". This occurs when a wireless modem is unable to sense transmissions from one or more of the other wireless modems due to obstructions or other interference. If one of these wireless modems is currently transmitting data to the base station the hidden node is unable to detect this and may begin its own transmission to the base station, which will result in a collision at the base station. For example, in FIG. 5 an obstruction 64 exists between wireless modem 46 and wireless modem 52, preventing wireless modem 52 from receiving RF signal 62. Wireless modem 52 therefore attempts to send data over RF link 60 at the same time wireless modem 46 is sending data over RF link 54.

As the number of wireless modems and the amount of data to be transmitted increases, the likelihood of a collision increases. Collisions can cause less efficient use of the RF channel.

An improvement to the CSMA/CA technique, that is useful during heavy traffic periods, is to use reservation slots. The group of wireless modems associated with a base station is divided into subgroups. The base station broadcasts messages to the overall group indicating which subgroup may attempt communication at any given time. Since the number of wireless modems that may access the media at any given time is reduced the chances for collisions are reduced. Careful selection of the members of a subgroup can also reduce the likelihood of hidden nodes; however, as the number of wireless modems increases, or the amount of data to be transmitted increases, the likelihood of collisions still increases. The use of reservation slots is not illustrated in the drawings.

Collisions due to high traffic load or hidden nodes can be completely avoided by using polling. In polling, the base station queries (polls) each wireless modem in round robin fashion to determine if it has data to transmit. If the wireless modem has data to transmit it responds by sending the data to the base station. If the wireless modem has no data to send it returns a special packet (a "null response") indicating that it does not wish to send data. The base station receives data or a null response from the wireless modem and then polls the next wireless modem. The sequence continues until the entire list of wireless modems has been polled and then repeats. Since only one wireless modem can be transmitting at any time there is no possibility for collision. Polling is illustrated in FIG. 6, in which base station 44 is sending data to or receiving data only from wireless modem 46 over RF link 54. Each of wireless modems 48, 50, and 52 remains inactive until it receives from base station 44 an RF packet with DEST 30 equal to its identifier.

Channel efficiency may be defined as the amount of time spent actually transmitting data compared to total available time, including time spent in overhead operations, such as polling modems that return no data or do not respond, transmitting RF link packet overhead, etc. During periods of heavy data traffic, polling may provide channel efficiency approaching 100% as almost every poll may return data if almost all modems have data to send. However, during periods of light traffic only a few wireless modems have data to transmit. In that case, each modem that has data to send is only allowed to transmit for a brief period of time and then must wait for an entire polling cycle before it can transmit more data. In the extreme cases where only one wireless modem wishes to transmit data the resulting channel efficiency will be very low if polling is used.

On the other hand, for CSMA/CA operation in an environment in which only a base station and a single wireless modem are operating, the channel efficiency may approach 100%. But as the number of active wireless modems increases the channel efficiency may become quite low. In fact, if too many wireless modems try to use the same RF channel, a condition known as channel collapse can occur, effectively rendering the RF channel unusable.

For polling operation the channel efficiency is greatest during periods of heavy traffic and may approach 100%. As the number of active wireless modems decreases the channel efficiency may decrease significantly. As an example, if there were 100 wireless modems being polled by a single base station and only one of the wireless modems were actively transmitting data the efficiency of the data channel would be roughly 1%. On the other hand if only one wireless modem was associated with the base station then the efficiency of the communication channel would be consistently close to 100%.

For example, in a typical outdoor wireless data network the distance between the base station and wireless modems might be 10 miles. Based on current technology, using direct sequence spread spectrum with a raw data throughput of 11 megabits per second, a polling operation between a base station and a wireless modem in which no data is exchanged will require approximately 0.5 milliseconds. For the same environment, if the base station and the wireless modem each transmitting the maximum allowable amount of data (e.g., 1518 octets for an Ethernet network) during the exchange, a total approximately 2.7 milliseconds will be required (1.1 millisecond for each transmission of 1518 octets). Ideally this would mean that the maximum efficiency of the RF channel is approximately 82% (2.2/2.7). If only the wireless modems were transmitting data, then approximately 1.6 milliseconds would be required, resulting in a channel efficiency of approximately 70%. If the base station were associated with 100 wireless modems, the worst-case channel efficiency (when only one wireless modem of the 100 wished to send data) would be approximately 2%.

From the discussion above it is evident that channel efficiency could be improved over both known polling methods and CSMA/CA by using polling if unnecessary polling of inactive or out-of-service modems could be reduced, particularly in situations in which traffic is generally moderate.

DETAILED DESCRIPTION

Figure 1:
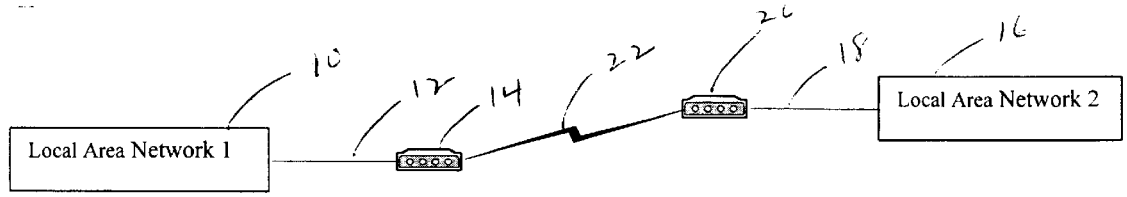
FIG. 1 illustrates the use of wireless modems to provide a wireless bridge between two local area networks.
Figure 2:
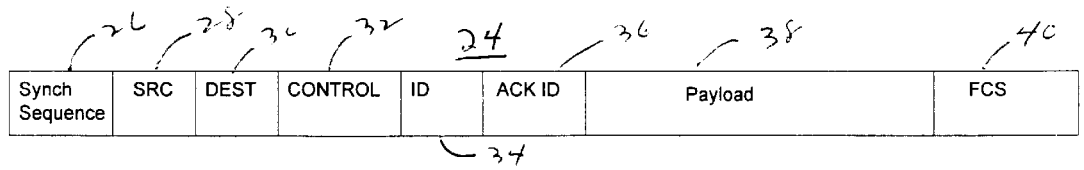
FIG. 2 is a schematic representation of typical RF link packet that would be transmitted from one wireless modem to another using protocol layering.
Figure 3:
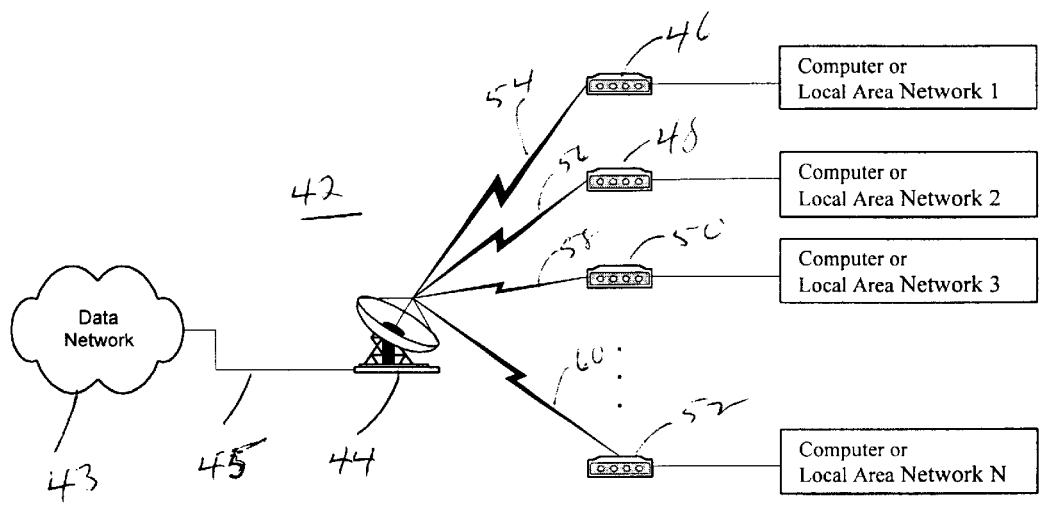
FIG. 3 is a schematic drawing showing a conventional point to multi-point wireless data communication network.
Figure 4:
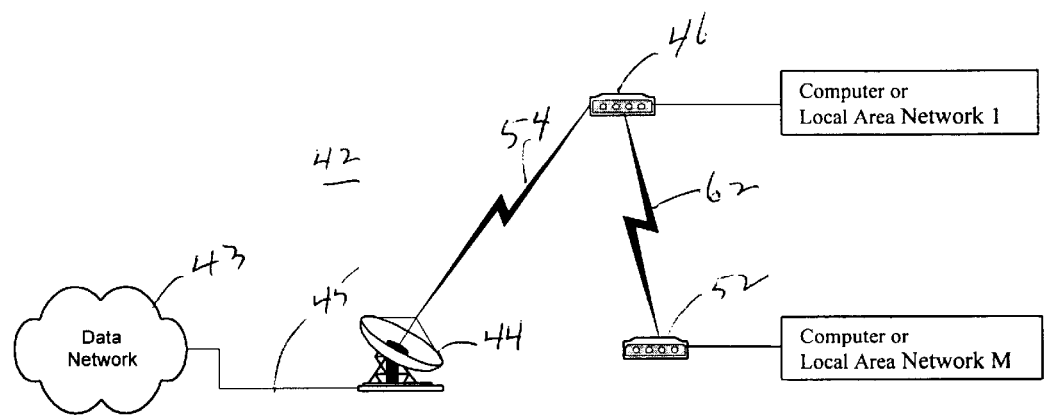
FIG. 4 is a schematic drawing showing conventional collision sense multiple access with collision avoidance ("CSMA/CA") techniques in which a base station or wireless modem wishing to transmit data on the radio link first listens to determine if the base station or other wireless modems are currently transmitting.
Figure 5:
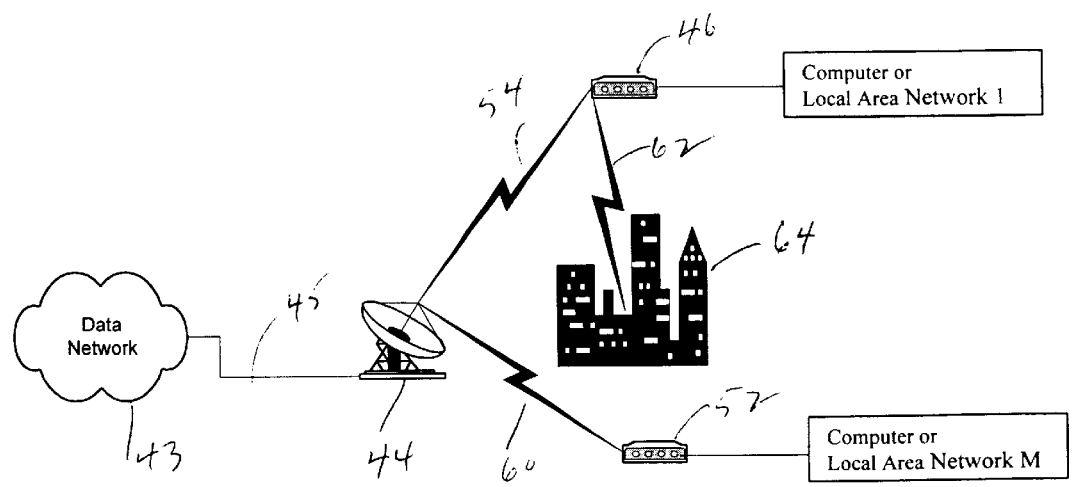
FIG. 5 is a schematic drawing showing how collisions can occur in a wireless network using CSMA/CA due to "hidden nodes".

In the following discussion "polling" and its various forms will normally have the meaning set out in the above discussion, namely, a procedure in which a signal is sent out by a base station containing data identifying a single target modem and all of the modems are programmed so that only the target modem attempts to respond (assuming that it receives the signal). However, where the context so requires in the following description and claims, "polling" may also mean sending a signal out that contains data inviting more than one modem to respond using CSMA/CA or other collision avoidance methods. Whenever modems are referred to as polled individually, then the normal meaning applies, whereas if more than one modem is polled at the same time, then the special meaning applies. "Polling" of a list may mean either polling each modem indicated on the list individually or polling all of the modems indicated on the list at once, depending upon the context.

Before describing embodiments of the inventive method in detail it may be helpful to the reader to describe generally the principles applied in each embodiment. Fundamentally, the basis of all of the embodiments is the dynamic updating of multiple lists of modems by the base station based upon the most recent behavior of the modems.

The first step in applying the inventive method is to form at least two lists. In the description that follows, the use of two lists is described first and then the use of three lists. Those skilled in the art will understand that four or more lists might be useful under some circumstances. In all embodiments described, the lists are initially populated by polling every modem that is known to the base station. However, the initial lists could be obtained in some other manner and provided to the base station. When initially polled, the modems either (1) send back data, (2) respond that they have no data to send back at present, or (3) fail to respond. In the following discussion it is assumed that those are the three possible behaviors, but again those skilled in the art will understand that other behaviors may be possible.

In the following discussion, lists of modems will be described as if each list were stored separately as a discrete list. As those skilled in computer programming will understand, the inventive method could be implemented by using a single list having a discrete entry for each modem and a flag or indicator of some kind associated with each entry to distinguish the entries that would otherwise be stored in discrete lists. That and other equivalent implementations are intended wherever in the following description and in the claims reference is made to more than one list of modems.

Once the multiple lists are available to the base station, the modems indicated in each list can be polled with a polling frequency that differs between the lists and the lists updated concurrently with the polling based upon the behavior of each modem. By moving modems from one list to another the disadvantage that a polling system has under some conditions as compared to a contention-based system can be reduced as the number of null responses and no responses are reduced by polling modems that have returned a null response ("inactive modems") and modems that have not responded ("out-of-service modems") less frequently.

Figure 6:
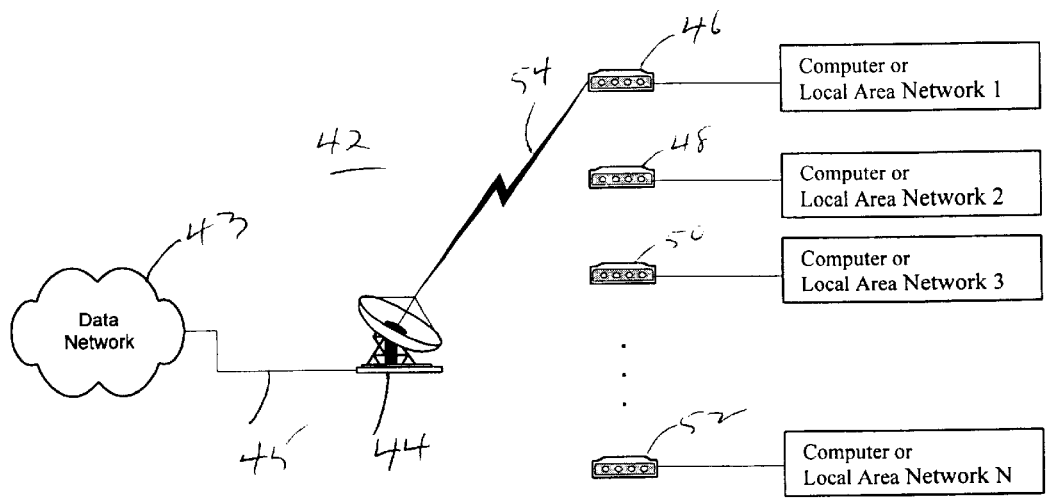
FIG. 6 is a schematic drawing showing how collisions due to high traffic load or hidden nodes can be avoided by using polling.

Each of the embodiments of the inventive method that are described below may be applied in a system such as point to multi-point wireless data communication network 42 shown in FIG. 6. It is assumed that a base station 44 is provided with a list of the addresses of the wireless modems with which it is expected to exchange data. In FIG. 6 only four modems, indicated by reference numerals 46, 48, 50, and 52, are shown. The base station 44 begins by polling each of the wireless modems 46, 48, 50, 52 in succession. Each wireless modem can behave in one of three ways:

(1) respond with data;
(2) respond indicating that it has no data to transmit (i.e., respond with a null response); or
(3) fail to respond.

Three embodiments of the invention using two lists are described below in relation to FIGS. 7, 8, and 9. Nine embodiments of the invention using three lists are then described in relation to FIGS. 10-18.

The use of two lists will be described first in relation to FIG. 7. At block 710 of FIG. 7, each modem is polled. Then, at block 712, two lists are formed. The first list indicates those modems that responded to the poll with data and the second list indicates those modems that responded without data or did not respond at all.

As two lists are used, the base station may poll the modems indicated on one list more frequently that the modems indicated on the other list. A simple way to do this is to poll all of the modems indicated on the first list some number of times, say $P_1$, then poll the modems indicated on the second list each once, and then repeat indefinitely. A slightly more complicated way to do this is to poll all of the modems indicated on the first list $P_1$ times, poll all of the modems indicated on the second list $P_2$ times, and then repeat indefinitely. Clearly, more complicated schemes could be devised. For example, the base station could alternately poll the next $P_1$ modems indicated on the first list and the next $P_2$ modems indicated on the second list (treating the lists as circular). Alternatively, $P_1$ and $P_2$ need not be limited to integer values; the first list could be fully polled a integer number of times, where the integer is chosen as the largest integer less than $P_1$, and then polled by the fractional portion of $P_1$ of the way through the first list again. After polling the second list in a similar fashion, the polling of the first list could continue where it was stopped and polled through to the same position in the list the integer number of times and then the fractional part again, and so forth indefinitely. The average frequency of polling a modem indicated in a particular list would be the same. However, for simplicity, unless otherwise stated in the following discussion, when a list is "polled", all modems indicated on the list are polled once before any modems on that list are polled again and before any modems on any other list are polled. In other words, $P_1$ and $P_2$ are assumed to be integer values. However, those skilled in the art will understand that there are many algorithms that could be used to obtain the same average frequency of polling based upon two lists.

Figure 7:
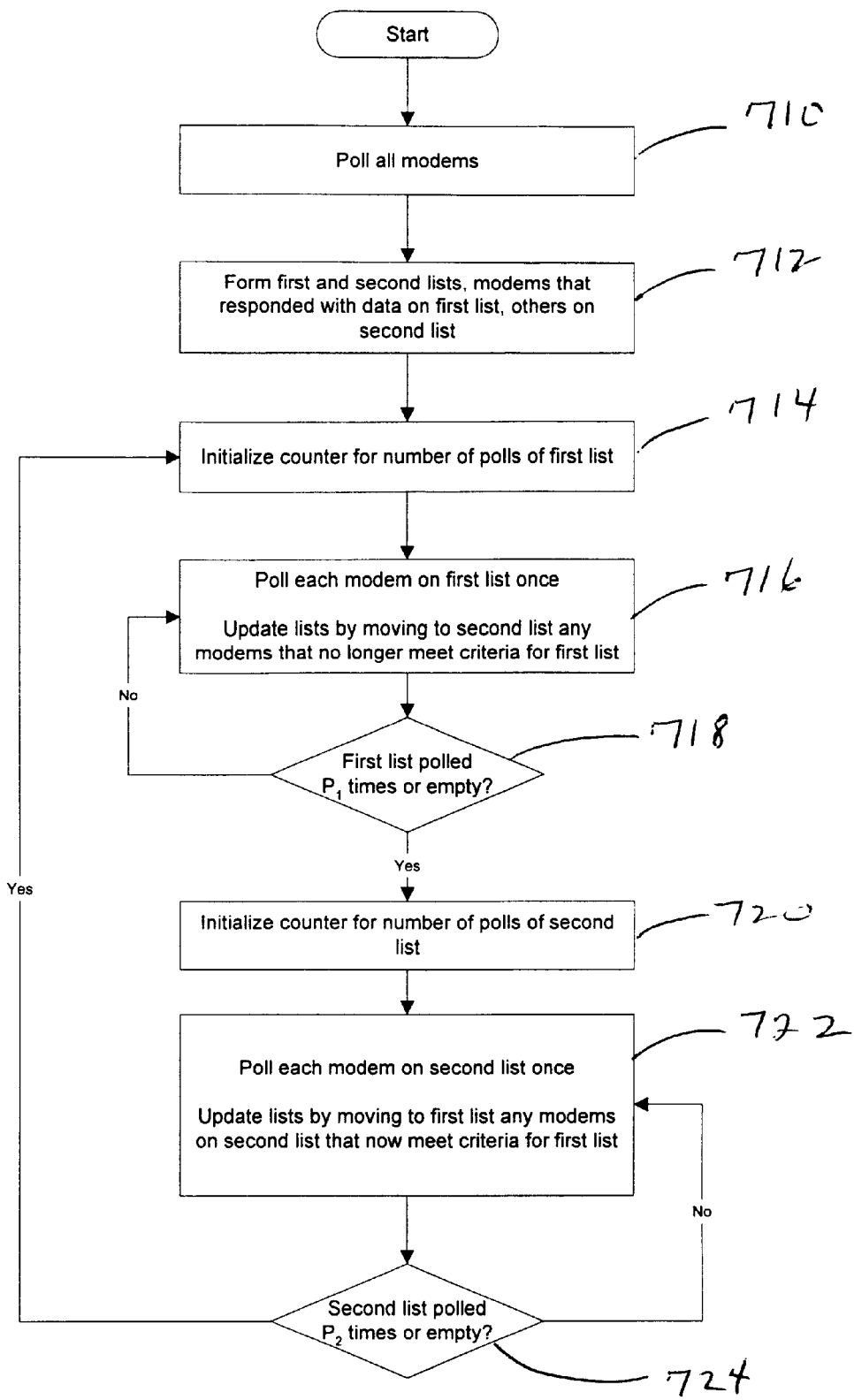
FIGS. 7 to 18 are flowcharts illustrating methods for implementing the present invention.

In FIG. 7, after the lists are initialized at block 712, at block 714 a counter for the number of polls of the first list is initialized and then a loop comprised of blocks 716 and 718 is used to poll all of the modems indicated in the first list $P_1$ times. In block 716 each modem indicated in the first list is polled once and any modems that do not respond or respond with no data are moved to the second list. Following block 716, the counter for number of polls of the first list is tested in block 718 and control returned to block 716 if the counter indicates that the first list has not been yet polled $P_1$ times and the first list is not empty. Otherwise control passes to block 720 in which a counter for the number of polls of the second list is initialized and then a loop comprised of blocks 722 and 724 is used to poll all of the modems indicated in the second list $P_2$ times. In block 722 each modem indicated in the second list is polled once and any modems that respond with data are moved to the first list. Following block 722, the counter for number of polls of the second list is tested in block 724 and control returned to block 722 if the counter indicates that the second list has not yet been polled $P_2$ times and the second list is not empty. Otherwise, control is returned to block 714.

It should be noted with respect to FIG. 7 that $P_1$ and $P_2$ are not modified during the polling process. However, $P_1$ and $P_2$ may be varied during operation to optimize some aspect or aspects of the operation of the system. The designer may decide to preset $P_1$ and $P_2$ if the operation of the system is expected to be stable. Alternatively, the designer may find that it is desirable to allow the operator of the system to reset $P_1$ and $P_2$ during the operation of the system or to change $P_1$ and $P_2$ and restart the system. An empirical approach to setting $P_1$ and $P_2$ is recommended. If operator intervention is allowed, then appropriate instructions may be executed to determine if a new value for $P_1$ and $P_2$ has be set by the operator. An empirical approach to setting $P_1$ and $P_2$ is recommended.

Figure 8:
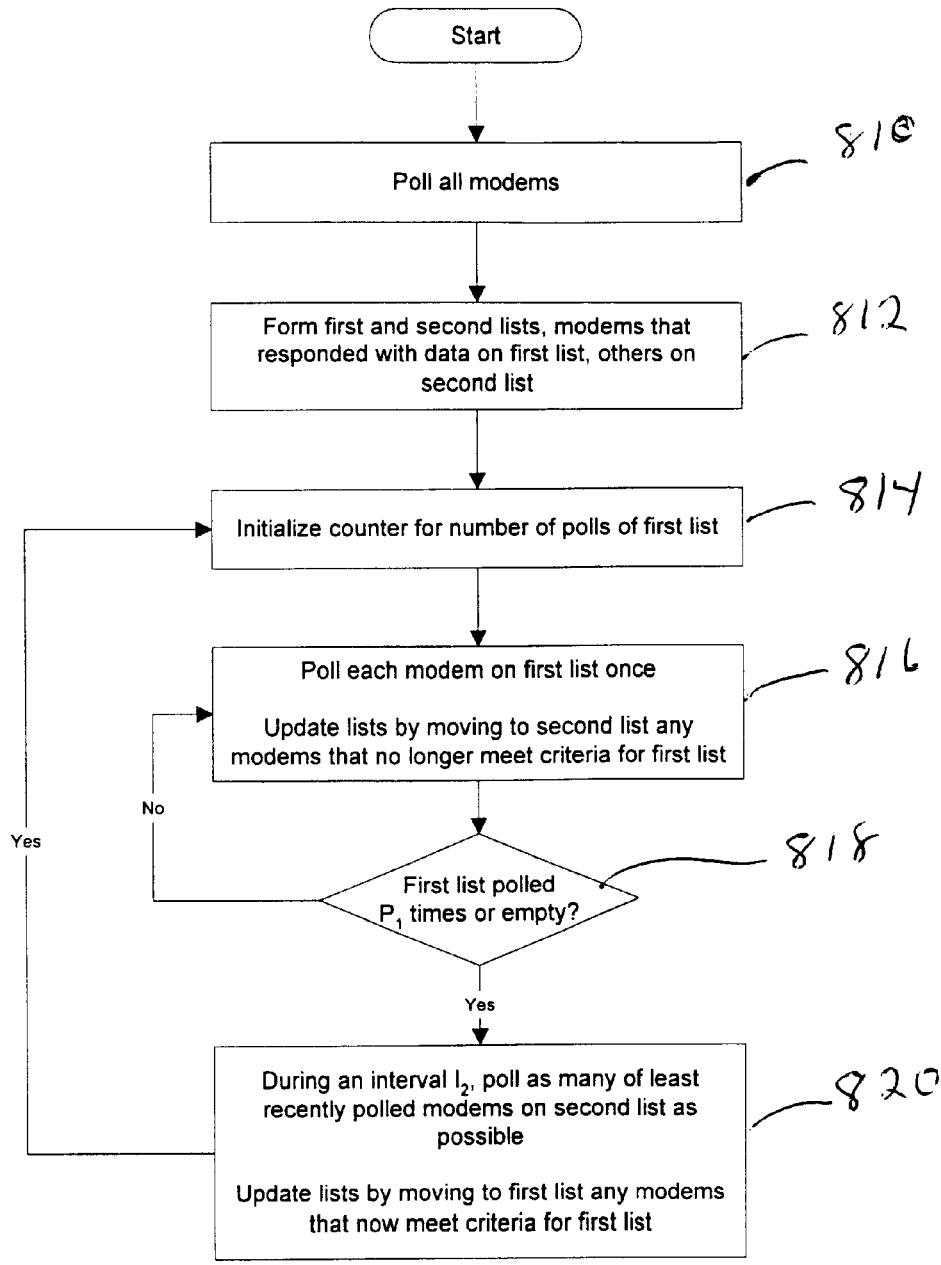
Figure 9:
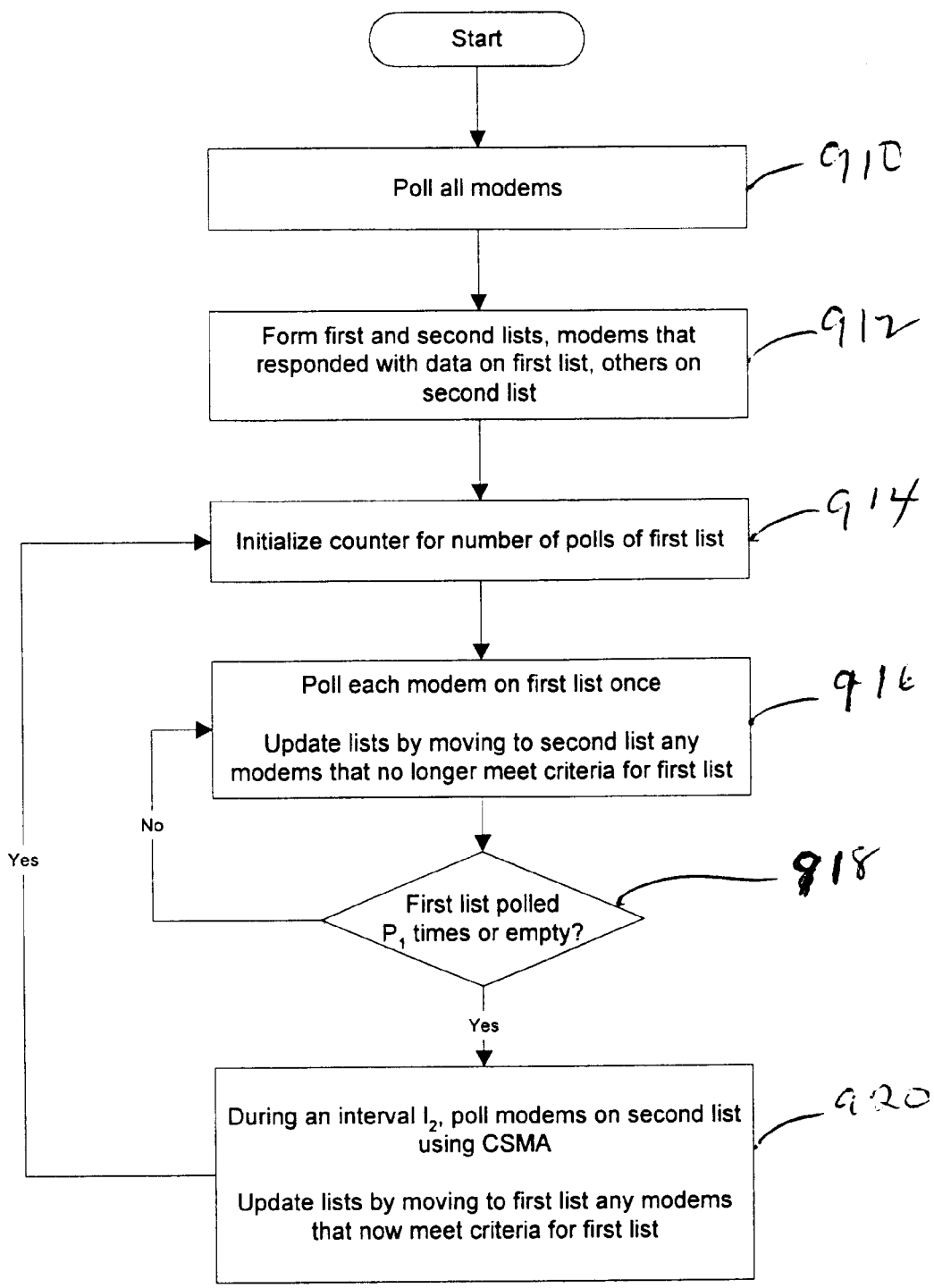

FIGS. 8 and 9 show two closely related embodiments of the invention that are variants of the embodiment shown in FIG. 7. In each, not all of the modems indicated on the second list are necessarily polled after the modems indicated on the first list are polled $P_1$ times. Instead, during an interval of pre-selected duration $I_2$, either the least recently polled modems indicated on the second list are polled or all of the modems indicated on the second list are polled at once using CSMA/CA techniques. Depending upon network conditions, a particular modem indicated on the second list may not be able to successfully send data to the base station during the first interval of pre-selected duration $I_2$ after that particular modem has data ready to send.

In FIG. 8, at block 810, each modem is polled. Then, at block 812, two lists are formed. The first list indicates those modems that responded to the poll with data and the second list indicates those modems that responded without data or did not respond at all. After the lists are formed, then at block 814 a counter for the number of polls of the first list is initialized and then a loop comprised of blocks 816 and 818 is used to poll all of the modems indicated in the first list $P_1$ times. In block 816 each modem indicated in the first list is polled once and any modems that do not respond or respond with no data are moved to the second list. Following block 816, the counter for number of polls of the first list is tested in block 818 and control returned to block 816 if the counter indicates that the first list has not been yet polled $P_1$ times and the first list is not empty. Otherwise control passes to block 820 in which as many as possible of the least recently polled modems indicated in the second list are polled during an interval of pre-selected duration $I_2$ and any modems that respond with data are moved to the first list. Following block 820, control is returned to block 814.

Similarly, in FIG. 9, at block 910, each modem is polled. Then, at block 912, two lists are formed. The first list indicates those modems that responded to the poll with data and the second list indicates those modems that responded without data or did not respond at all. After the lists are formed, then at block 914 a counter for the number of polls of the first list is initialized and then a loop comprised of blocks 916 and 918 is used to poll all of the modems indicated in the first list $P_1$ times. In block 916 each modem indicated in the first list is polled once and any modems that do not respond or respond with no data are moved to the second list. Following block 916, the counter for number of polls of the first list is tested in block 818 and control returned to block 916 if the counter indicates that the first list has not been yet polled $P_1$ times and the first list is not empty. Otherwise control passes to block 920 in which the modems indicated in the second list are polled using CSMA/CA techniques during an interval of pre-selected duration $I_2$ and any modems that respond with data are moved to the first list. Following block 920, control is returned to block 914.

The use of three lists will be described first in relation to FIG. 10. At block 1010 of FIG. 10, each modem is polled. Then, at block 1012, three lists are formed. The first list indicates those modems that responded to the poll with data, the second list indicates those modems that responded without data, and the three list indicates those modems that did not respond at all. In the following discussion of all embodiments of the invention using three lists and in the claims these three lists are referred to as the "active list", the "inactive list", and the "out-of-service list", respectively.

Figure 10:
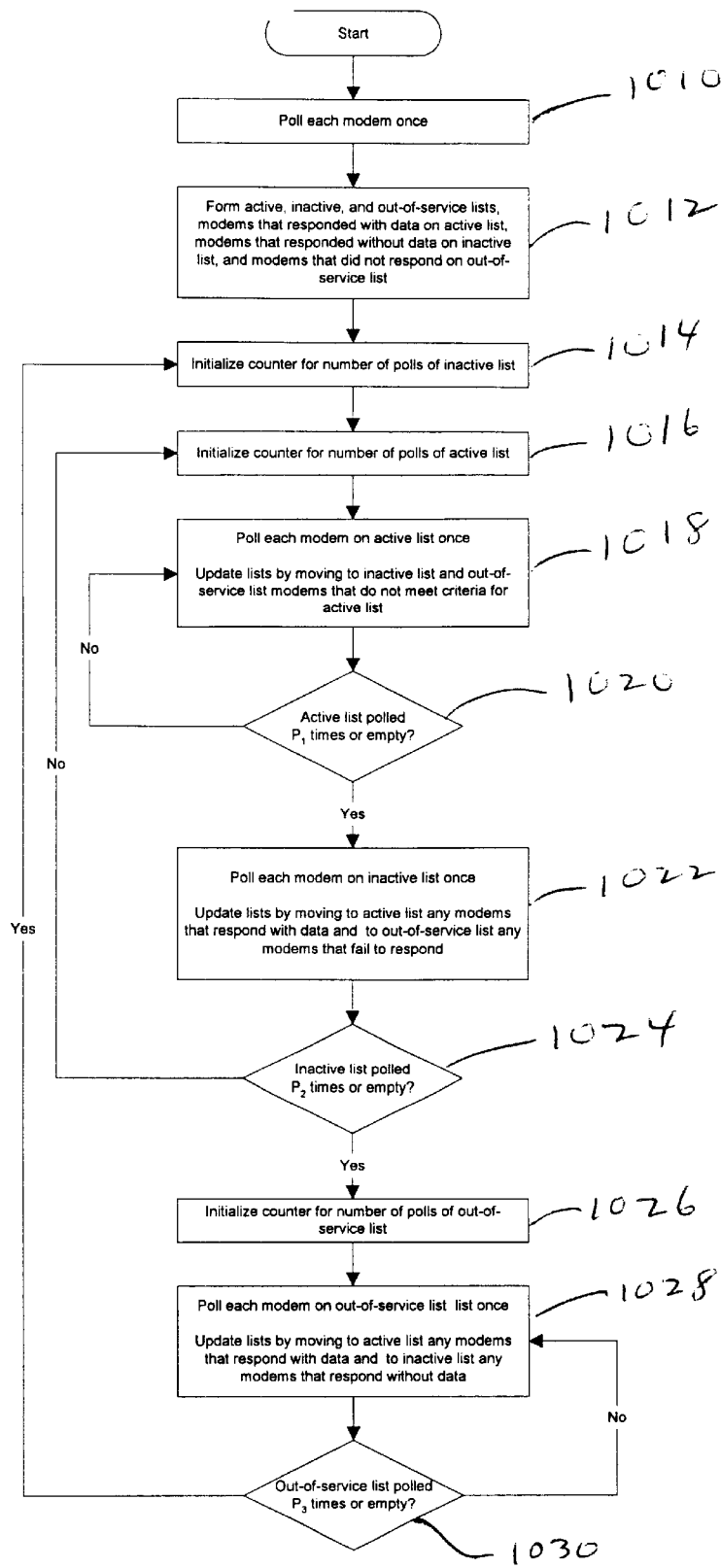

In FIG. 10, after the lists are initialized at block 1012, at blocks 1014 and 1016 counters for the number of polls of the inactive list and the active list, respectively, are initialized and then a loop comprised of blocks 1018 and 1020 is used to poll all of the modems indicated in the active list $P_1$ times. In block 1018 each modem indicated in the active list is polled once and any modems that do not respond or respond with no data are moved to the inactive list or the out-of-service list, as appropriate. Following block 1018, the counter for number of polls of the active list is tested in block 1020 and control returned to block 1018 if the counter indicates that the active list has not been yet polled $P_1$ times and the active list is not empty. Otherwise, control passes to block 1022 in which each modem indicated in the inactive list is polled once and any modems that respond with data are moved to the active list and any that do not respond are moved to the out-of-service list. Following block 1022, the counter for number of polls of the inactive list is tested in block 1024 and control returned to block 1016 if the counter indicates that the inactive list has not been yet polled $P_2$ times and the inactive list is not empty. Otherwise, control passes to block 1026 in which a counter for the number of polls of the out-of-service list is initialized and then a loop comprised of blocks 1028 and 1030 is used to poll all of the modems indicated in the out-of-service list $P_3$ times. In block 1028 each modem indicated in the out-of-service list is polled once and any modems that respond with data are moved to the active list and any that respond with no data are moved to the inactive list. Following block 1028, the counter for number of polls of the out-of-service list is tested in block 1030 and control returned to block 1028 if the counter indicates that the out-of-service list has not been yet polled $P_3$ times and the out-of-service list is not empty. Otherwise, control is returned to block 1014. Repeated polling of the out-of-service list in the 1028/1030 loop is optional. $P_3$ may be set to 1 or blocks 1026 and 1030 simply omitted, so that following execution of block 1028, control is returned to block 1014.

Figure 11:
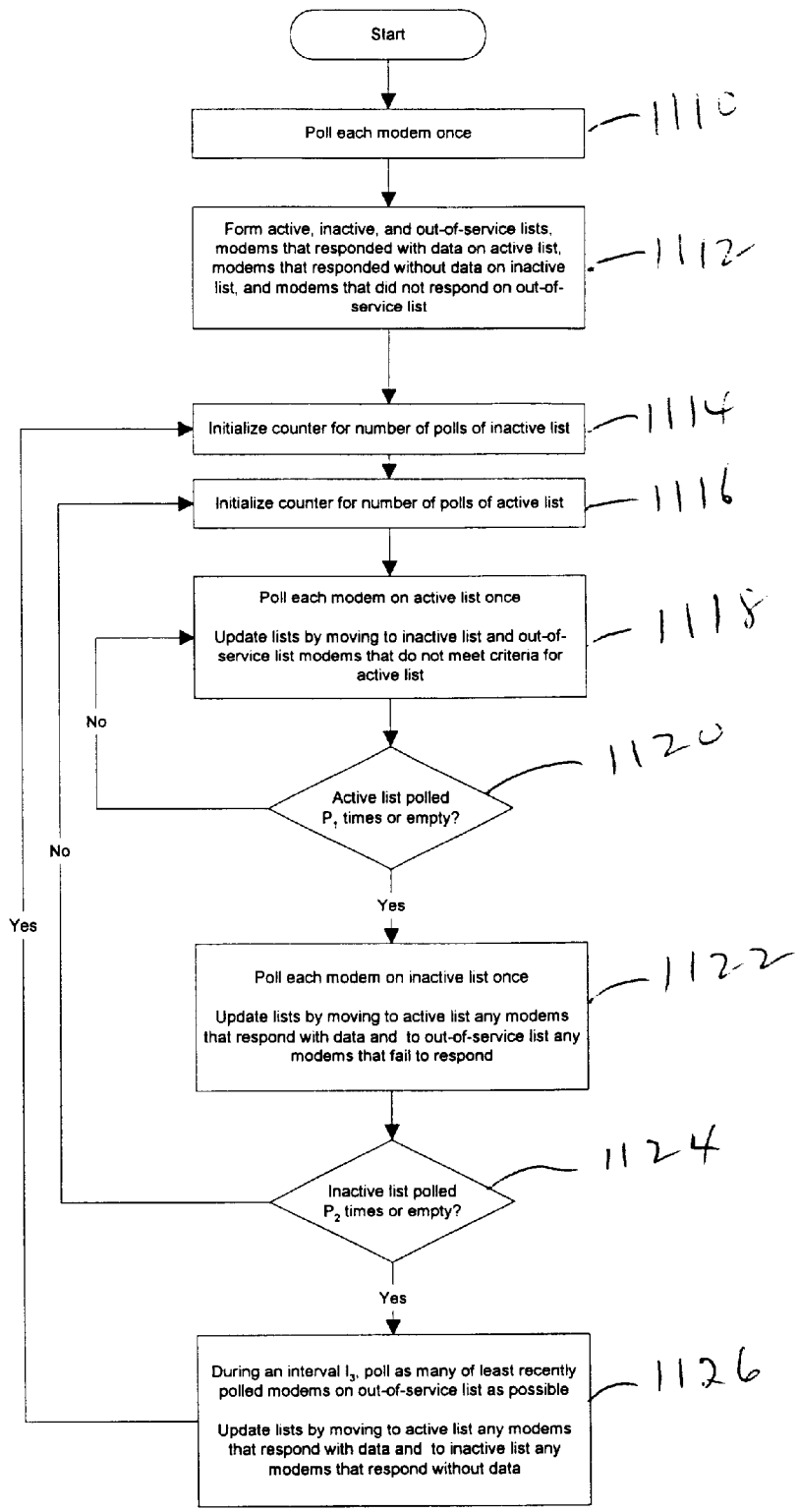
Figure 12:
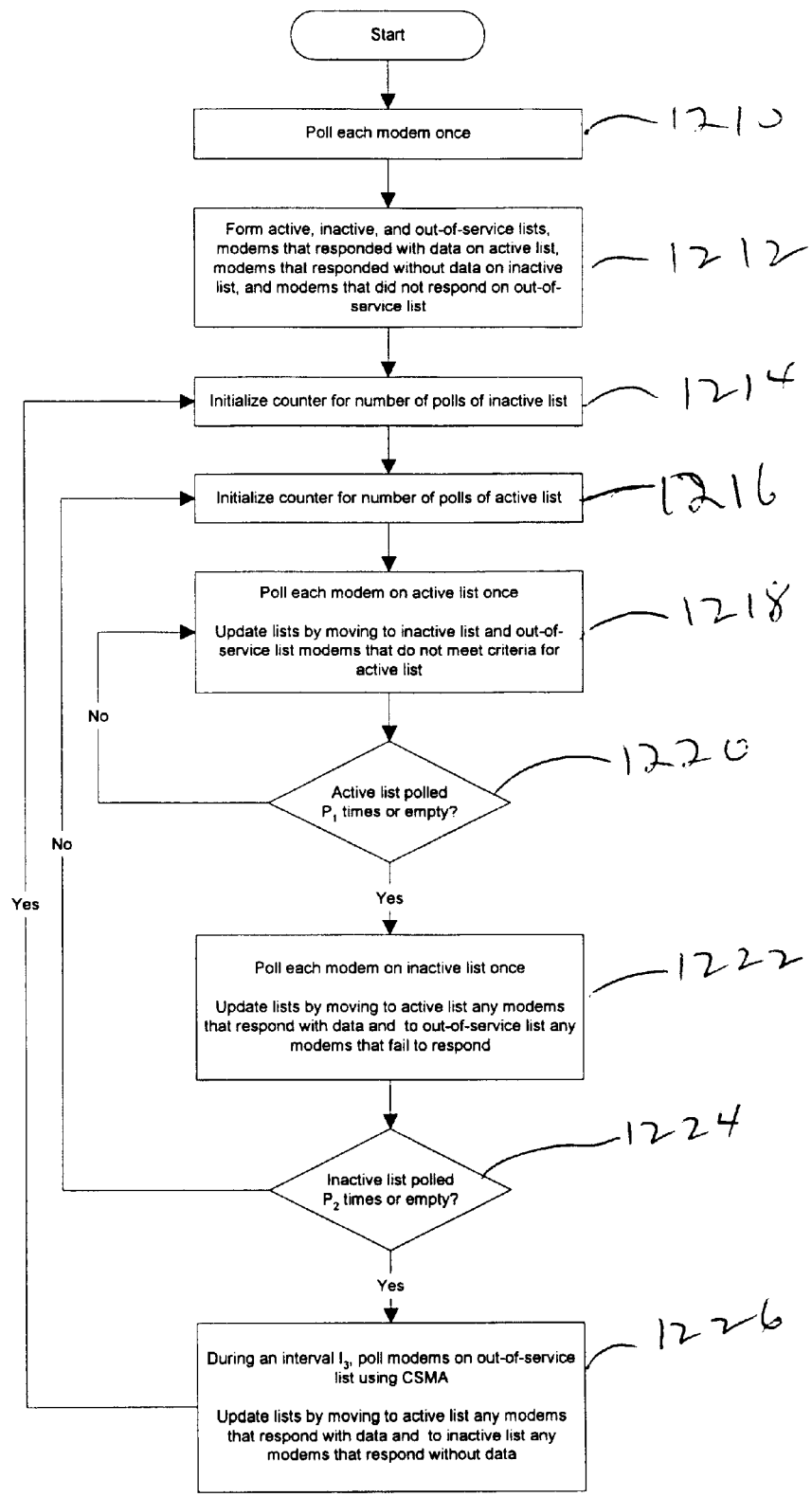

FIGS. 11 and 12 show two closely related embodiments of the invention that are variants of the embodiment shown in FIG. 10. In each, not all of the modems indicated on the out-of-service list are necessarily polled after the modems indicated on the inactive list are polled $P_2$ times. Instead, during an interval of pre-selected duration $I_3$, either the least recently polled modems indicated on the out-of-service list are polled or all of the modems indicated on the out-of-service list are polled at once using CSMA/CA techniques. Depending upon network conditions, a particular modem indicated on the out-of-service list may not be able to successfully send data to the base station during the first interval of pre-selected duration $I_3$ after that particular modem has data ready to send.

At block 1110 of FIG. 11, each modem is polled and at block 1112, active, inactive, and out-of-service lists are initialized as described in relation to block 1012 of FIG. 10. Then, at blocks 1114 and 1116 counters for the number of polls of the inactive list and the active list, respectively, are initialized and then a loop comprised of blocks 1118 and 1120 is used to poll all of the modems indicated in the active list $P_1$ times. In block 1118 each modem indicated in the active list is polled once and any modems that do not respond or respond with no data are moved to the inactive list or the out-of-service list, as appropriate. Following block 1118, the counter for number of polls of the active list is tested in block 1120 and control returned to block 1118 if the counter indicates that the active list has not been yet polled $P_1$ times and the active list is not empty. Otherwise, control passes to block 1122 in which each modem indicated in the inactive list is polled once and any modems that respond with data are moved to the active list and any that do not respond are moved to the out-of-service list. Following block 1122, the counter for number of polls of the inactive list is tested in block 1124 and control returned to block 1116 if the counter indicates that the inactive list has not been yet polled $P_2$ times and the inactive list is not empty. Otherwise, control passes to block 1126 in which as many as possible of the least recently polled modems indicated in the out-of-service list are polled during an interval of pre-selected duration $I_3$ and any modems that respond with data are moved to the active list and any modems that respond but without data are moved to the inactive list. Following block 1126, control is returned to block 1114. The result of the process described in FIG. 11 is that the modems indicated on the active list are polled $P_1$ times as frequently as the modems indicated on the inactive list and the modems indicated on the inactive list are polled $P_2$ times for each time the out-of-service list is polled.

At block 1210 of FIG. 12, each modem is polled and at block 1212, active, inactive, and out-of-service lists are initialized as described in relation to block 1012 of FIG. 10. Then, at blocks 1214 and 1216 counters for the number of polls of the inactive list and the active list, respectively, are initialized and then a loop comprised of blocks 1218 and 1220 is used to poll all of the modems indicated in the active list $P_1$ times. In block 1218 each modem indicated in the active list is polled once and any modems that do not respond or respond with no data are moved to the inactive list or the out-of-service list, as appropriate. Following block 1218, the counter for number of polls of the active list is tested in block 1220 and control returned to block 1218 if the counter indicates that the active list has not been yet polled $P_1$ times and the active list is not empty. Otherwise, control passes to block 1222 in which each modem indicated in the inactive list is polled once and any modems that respond with data are moved to the active list and any that do not respond are moved to the out-of-service list. Following block 1222, the counter for number of polls of the inactive list is tested in block 1224 and control returned to block 1216 if the counter indicates that the inactive list has not been yet polled $P_2$ times and the inactive list is not empty. Otherwise, control passes to block 1226 in which the modems indicated in the out-of-service list are polled using CSMA/CA techniques during an interval of pre-selected duration $I_3$ and any modems that respond with data are moved to the active list and any modems that respond but without data are moved to the inactive list. Following block 1226, control is returned to block 1214. The result of the process described in FIG. 12 is that the modems indicated on the active list are polled $P_1$ times as frequently as the modems indicated on the inactive list and the modems indicated on the inactive list are polled $P_2$ times for each time the out-of-service list is polled.

Figure 13:
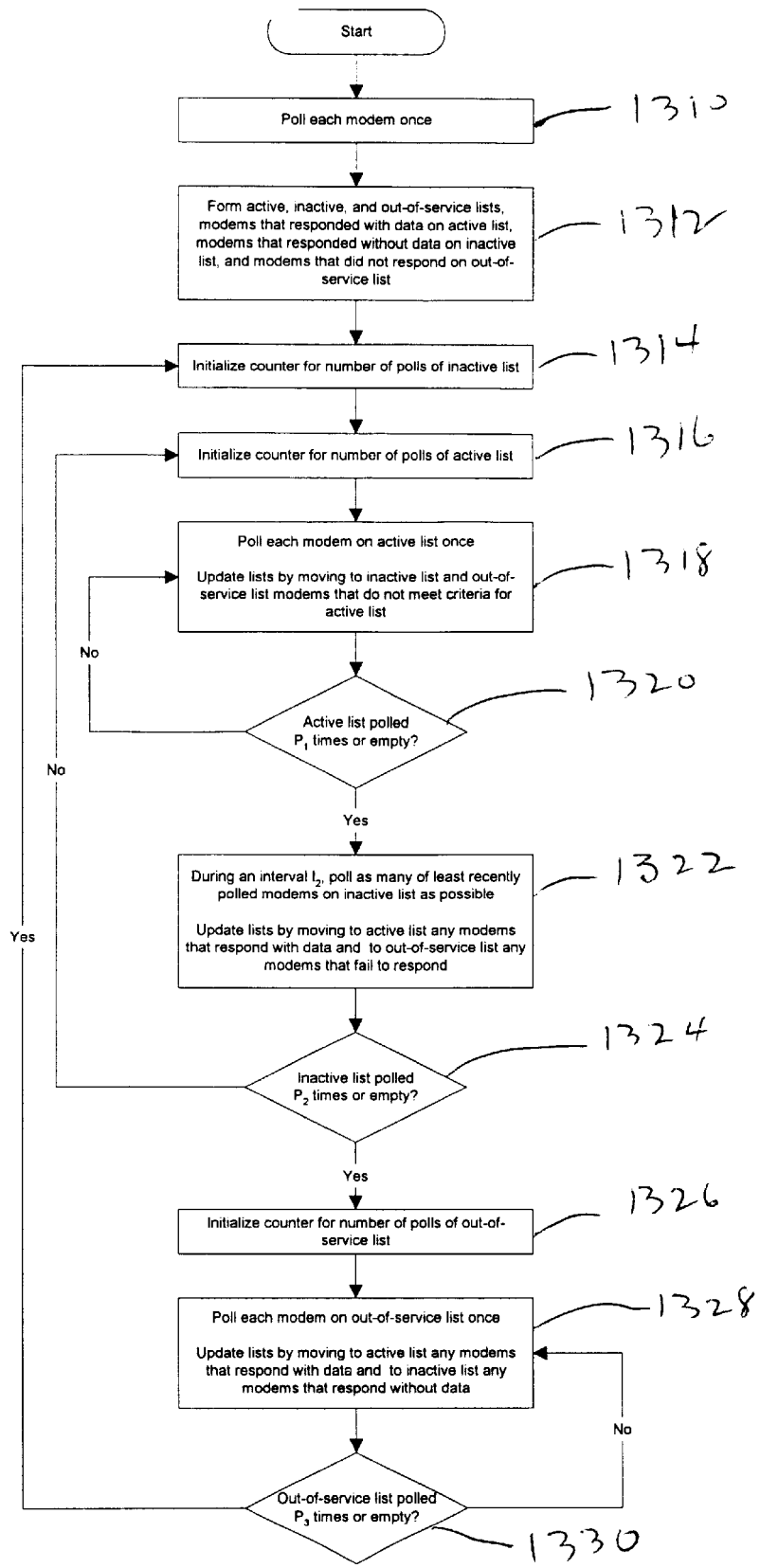
Figure 14:
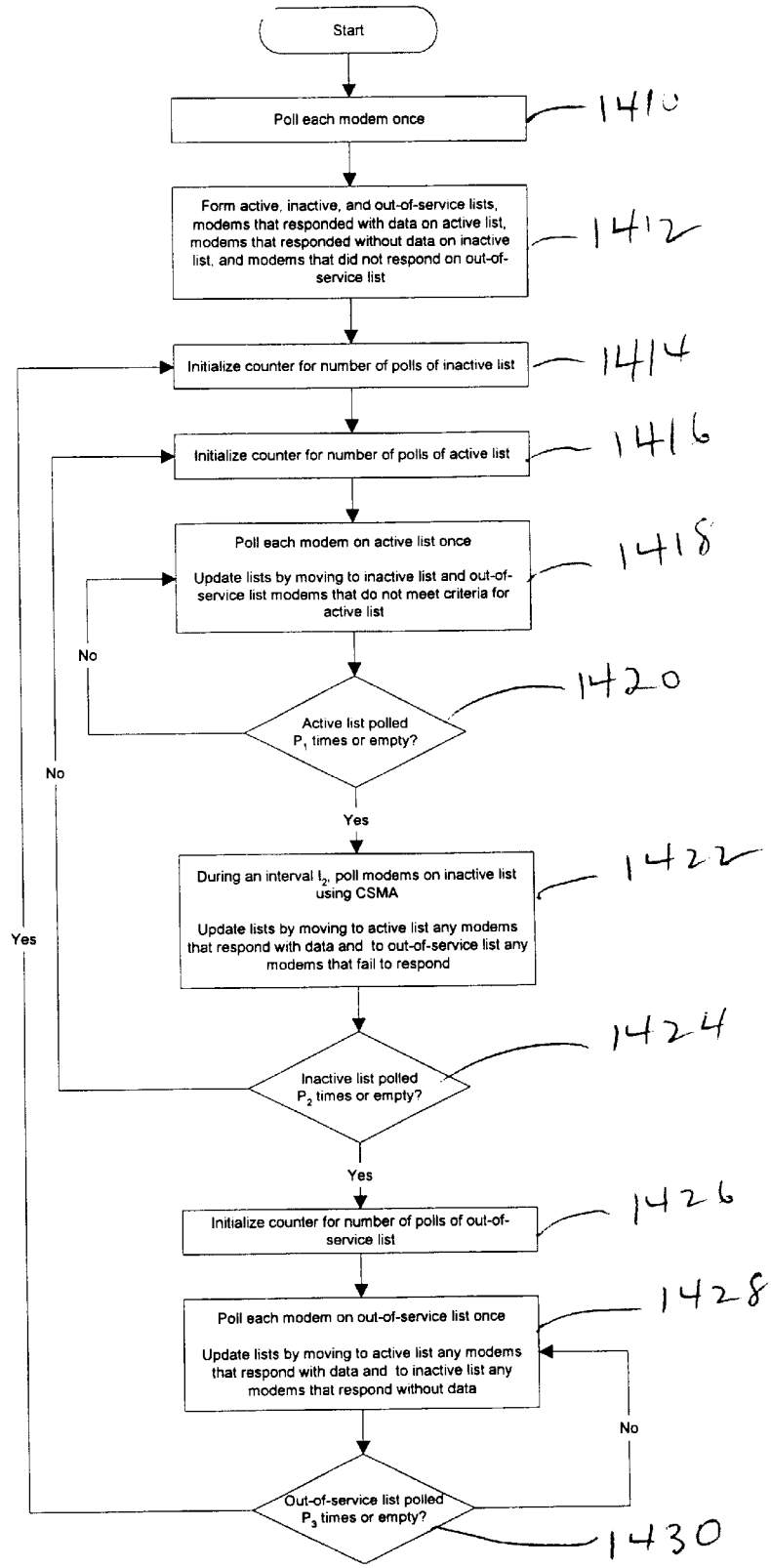

FIGS. 13 and 14 show two further closely related embodiments of the invention that are variants of the embodiment shown in FIG. 10. In each, not all of the modems indicated on the inactive list are necessarily polled after the modems indicated on the active list are polled $P_1$ times. Instead, during an interval of pre-selected duration $I_2$, either the least recently polled modems indicated on the inactive list are polled or all of the modems indicated on the inactive list are polled at once using CSMA/CA techniques. Depending upon network conditions, a particular modem indicated on the inactive list may not be able to successfully send data to the base station during the first interval of pre-selected duration $I_2$ after that particular modem has data ready to send.

At block 1310 of FIG. 13, each modem is polled and at block 1312, active, inactive, and out-of-service lists are initialized as described in relation to block 1012 of FIG. 10. Then, at blocks 1314 and 1316 counters for the number of polls of the inactive list and the active list, respectively, are initialized and then a loop comprised of blocks 1318 and 1320 is used to poll all of the modems indicated in the active list $P_1$ times. In block 1318 each modem indicated in the active list is polled once and any modems that do not respond or respond with no data are moved to the inactive list or the out-of-service list, as appropriate. Following block 1318, the counter for number of polls of the active list is tested in block 1320 and control returned to block 1318 if the counter indicates that the active list has not been yet polled $P_1$ times and the active list is not empty. Otherwise, control passes to block 1322 in which as many as possible of the least recently polled modems indicated in the inactive list are polled during an interval of pre-selected duration $I_2$ and any modems that respond with data are moved to the active list and any modems that do not respond are moved to the out-of-service list. Following block 1322, the counter for number of polls of the inactive list is tested in block 1324 and control returned to block 1316 if the counter indicates that the inactive list has not been yet polled $P_2$ times and the inactive list is not empty. Otherwise, control passes to block 1326 in which a counter for the number of polls of the out-of-service list is initialized and then a loop comprised of blocks 1328 and 1330 is used to poll all of the modems indicated in the out-of-service list $P_3$ times. In block 1328 each modem indicated in the out-of-service list is polled once and any modems that respond with data are moved to the active list and any that respond with no data are moved to the inactive list. Following block 1328, the counter for number of polls of the out-of-service list is tested in block 1330 and control returned to block 1328 if the counter indicates that the out-of-service list has not been yet polled $P_3$ times and the out-of-service list is not empty. Otherwise, control is returned to block 1314. Repeated polling of the out-of-service list in the 1328/1330 loop is optional. $P_3$ may be set to 1 or blocks 1326 and 1330 simply omitted, so that following execution of block 1328, control is returned to block 1314.

At block 1410 of FIG. 14, each modem is polled and at block 1412, active, inactive, and out-of-service lists are initialized as described in relation to block 1012 of FIG. 10. Then, at blocks 1414 and 1416 counters for the number of polls of the inactive list and the active list, respectively, are initialized and then a loop comprised of blocks 1418 and 1420 is used to poll all of the modems indicated in the active list $P_1$ times. In block 1418 each modem indicated in the active list is polled once and any modems that do not respond or respond with no data are moved to the inactive list or the out-of-service list, as appropriate. Following block 1418, the counter for number of polls of the active list is tested in block 1420 and control returned to block 1418 if the counter indicates that the active list has not been yet polled $P_1$ times and the active list is not empty. Otherwise, control passes to block 1422 in which the modems indicated in the out-of-service list are polled using CSMA/CA techniques during an interval of preselected duration $I_2$ and any modems that respond with data are moved to the active list and any modems that do not respond are moved to the out-of-service list. Following block 1422, the counter for number of polls of the inactive list is tested in block 1424 and control returned to block 1416 if the counter indicates that the inactive list has not been yet polled $P_2$ times and the inactive list is not empty. Otherwise, control passes to block 1426 in which a counter for the number of polls of the out-of-service list is initialized and then a loop comprised of blocks 1428 and 1430 is used to poll all of the modems indicated in the out-of-service list $P_3$ times. In block 1428 each modem indicated in the out-of-service list is polled once and any modems that respond with data are moved to the active list and any that respond with no data are moved to the inactive list. Following block 1428, the counter for number of polls of the out-of-service list is tested in block 1430 and control returned to block 1428 if the counter indicates that the out-of-service list has not been yet polled $P_3$ times and the out-of-service list is not empty. Otherwise, control is returned to block 1414. Repeated polling of the out-of-service list in the 1428/1430 loop is optional. $P_3$ may be set to 1 or blocks 1426 and 1430 simply omitted, so that following execution of block 1428, control is returned to block 1414.

FIGS. 15, 16, 17, and 18 show four further closely related embodiments of the invention that are variants of the embodiment shown in FIG. 10. In each, not all of the modems indicated on the inactive list are necessarily polled after the modems indicated on the active list are polled $P_1$ times. Instead, during an interval of pre-selected duration $I_2$, either the least recently polled modems indicated on the inactive list are polled or all of the modems indicated on the inactive list are polled at once using CSMA/CA techniques and during an interval of pre-selected duration $I_3$, either the least recently polled modems indicated on the out-of-service list are polled or all of the modems indicated on the out-of-service list are polled at once using CSMA/CA techniques. Depending upon network conditions, a particular modem indicated on the inactive list may not be able to successfully send data to the base station during the first interval of pre-selected duration $I_2$ after that particular modem has data ready to send and a particular modem indicated on the out-of-service list may not be able to successfully send data to the base station during the first interval of pre-selected duration $I_3$ after that particular modem has data ready to send.

Figure 15:
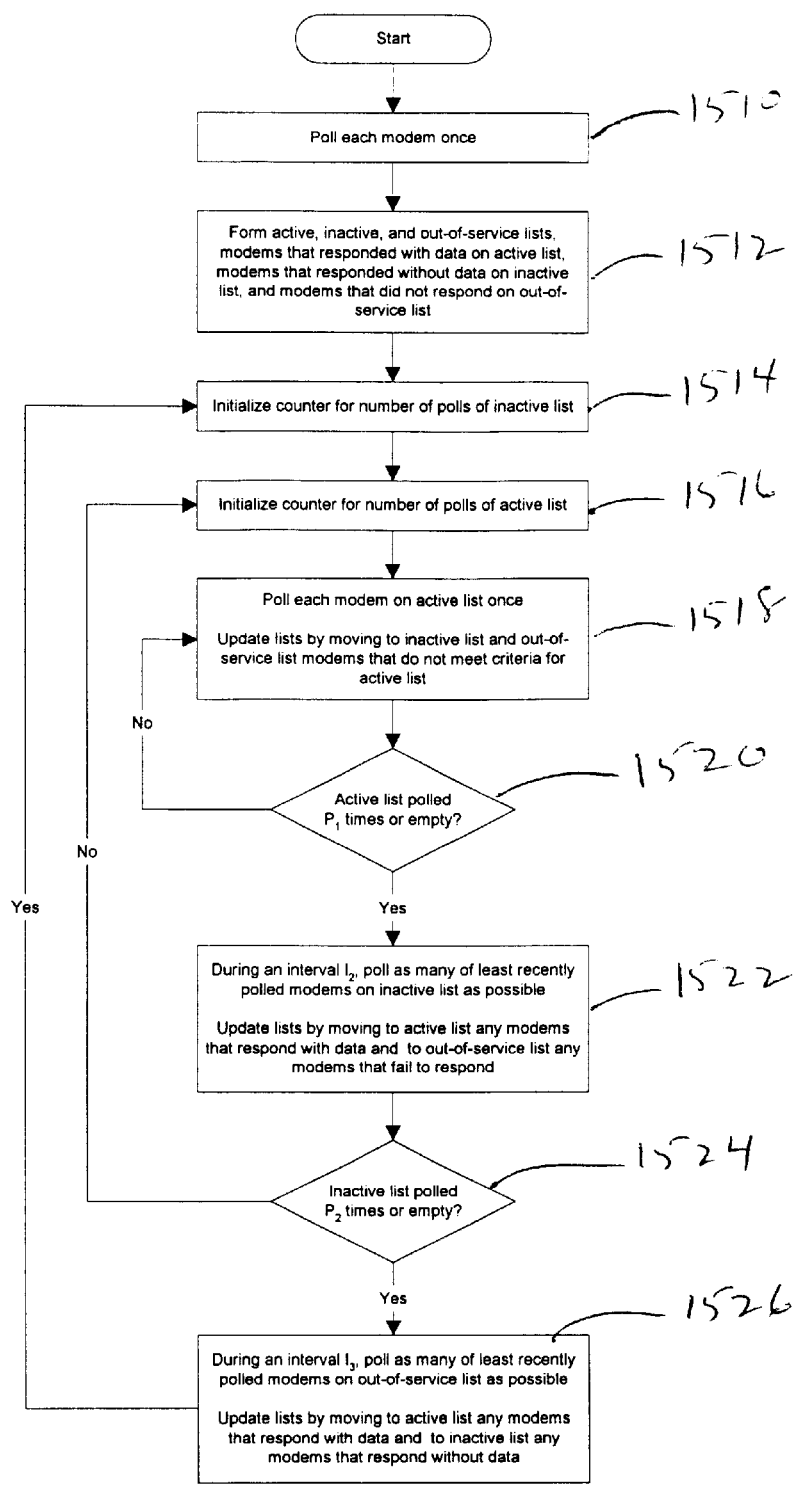

At block 1510 of FIG. 15, each modem is polled and at block 1512, active, inactive, and out-of-service lists are initialized as described in relation to block 1012 of FIG. 10. Then, at blocks 1514 and 1516 counters for the number of polls of the inactive list and the active list, respectively, are initialized and then a loop comprised of blocks 1518 and 1520 is used to poll all of the modems indicated in the active list $P_1$ times. In block 1518 each modem indicated in the active list is polled once and any modems that do not respond or respond with no data are moved to the inactive list or the out-of-service list, as appropriate. Following block 1518, the counter for number of polls of the active list is tested in block 1520 and control returned to block 1518 if the counter indicates that the active list has not been yet polled $P_1$ times and the active list is not empty. Otherwise, control passes to block 1522 in which as many as possible of the least recently polled modems indicated in the inactive list are polled during an interval of preselected duration $I_2$ and any modems that respond with data are moved to the active list and any modems that do not respond are moved to the out-of-service list. Following block 1522, the counter for number of polls of the inactive list is tested in block 1524 and control returned to block 1516 if the counter indicates that the inactive list has not been yet polled $P_2$ times and the inactive list is not empty. Otherwise, control passes to block 1526 in which as many as possible of the least recently polled modems indicated in the out-of-service list are polled during an interval of pre-selected duration $I_3$ and any modems that respond with data are moved to the active list and any modems that respond but without data are moved to the inactive list. Following block 1526, control is returned to block 1514.

Figure 16:
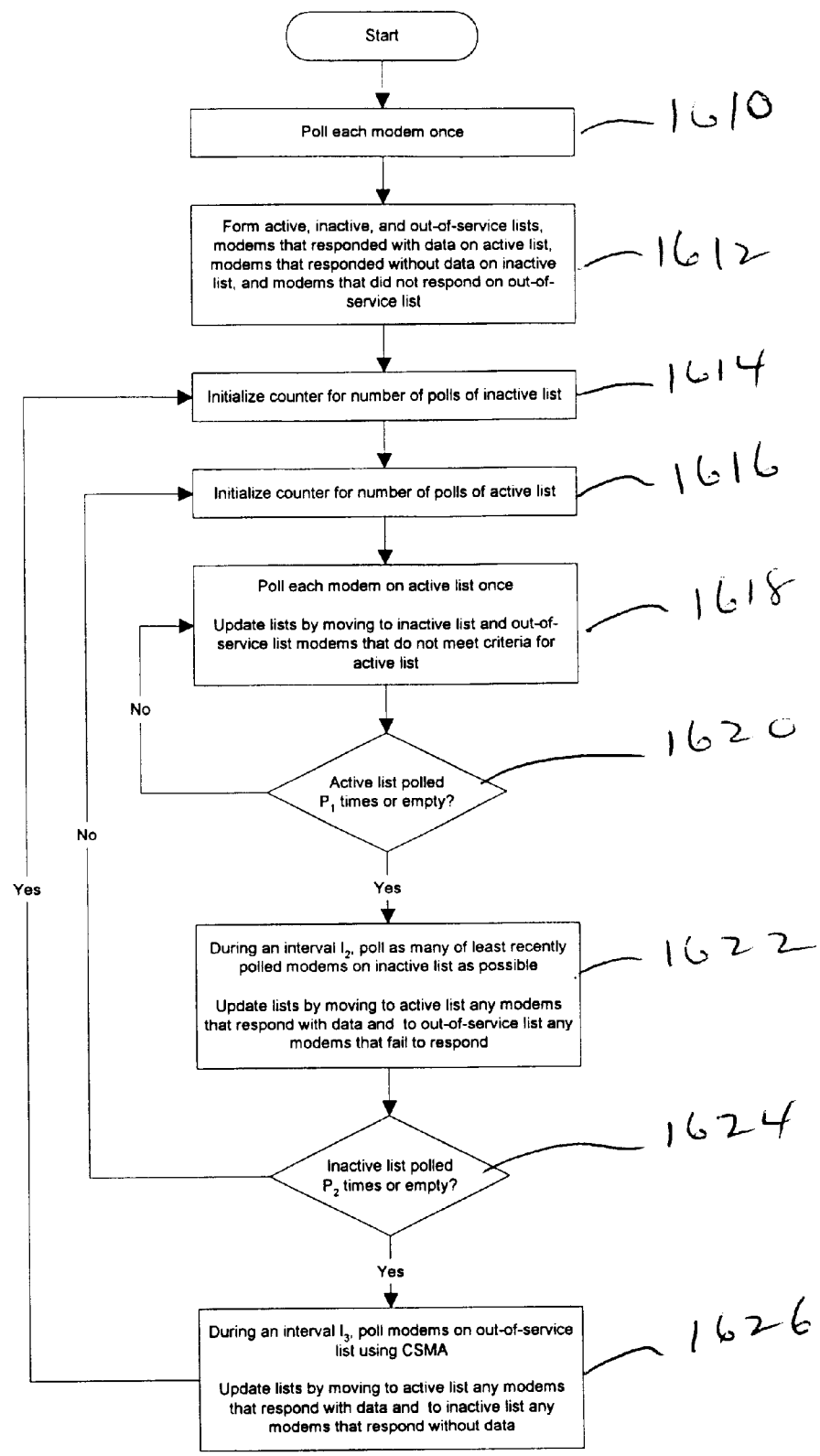

At block 1610 of FIG. 16, each modem is polled and at block 1612, active, inactive, and out-of-service lists are initialized as described in relation to block 1012 of FIG. 10. Then, at blocks 1614 and 1616 counters for the number of polls of the inactive list and the active list, respectively, are initialized and then a loop comprised of blocks 1618 and 1620 is used to poll all of the modems indicated in the active list $P_1$ times. In block 1618 each modem indicated in the active list is polled once and any modems that do not respond or respond with no data are moved to the inactive list or the out-of-service list, as appropriate. Following block 1618, the counter for number of polls of the active list is tested in block 1620 and control returned to block 1618 if the counter indicates that the active list has not been yet polled $P_1$ times and the active list is not empty. Otherwise, control passes to block 1622 in which as many as possible of the least recently polled modems indicated in the inactive list are polled during an interval of pre-selected duration $I_2$ and any modems that respond with data are moved to the active list and any modems that do not respond are moved to the out-of-service list. Following block 1622, the counter for number of polls of the inactive list is tested in block 1624 and control returned to block 1616 if the counter indicates that the inactive list has not been yet polled $P_2$ times and the inactive list is not empty. Otherwise, control passes to block 1626 in which the modems indicated in the out-of-service list are polled using CSMA/CA techniques during an interval of pre-selected duration $I_3$ and any modems that respond with data are moved to the active list and any modems that respond but without data are moved to the inactive list. Following block 1626, control is returned to block 1614.

Figure 17:
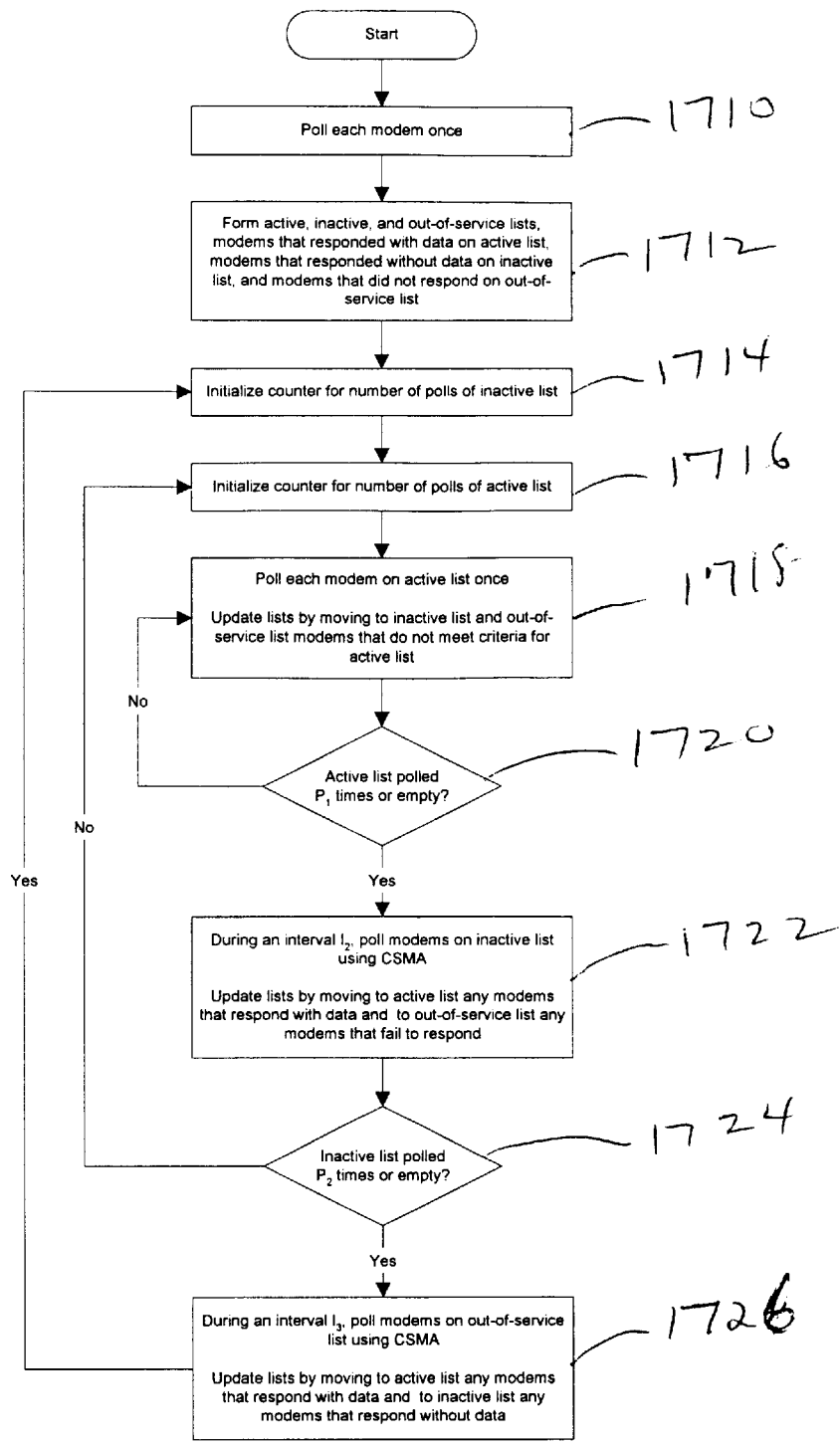

At block 1710 of FIG. 17, each modem is polled and at block 1712, active, inactive, and out-of-service lists are initialized as described in relation to block 1012 of FIG. 10. Then, at blocks 1714 and 1716 counters for the number of polls of the inactive list and the active list, respectively, are initialized and then a loop comprised of blocks 1718 and 1720 is used to poll all of the modems indicated in the active list $P_1$ times. In block 1718 each modem indicated in the active list is polled once and any modems that do not respond or respond with no data are moved to the inactive list or the out-of-service list, as appropriate. Following block 1718, the counter for number of polls of the active list is tested in block 1720 and control returned to block 1718 if the counter indicates that the active list has not been yet polled $P_1$ times and the active list is not empty. Otherwise, control passes to block 1722 in which in which the modems indicated in the inactive list are polled using CSMA/CA techniques during an interval of pre-selected duration $I_2$ and any modems that respond with data are moved to the active list and any modems that do not respond are moved to the out-of-service list. Following block 1722, the counter for number of polls of the inactive list is tested in block 1724 and control returned to block 1716 if the counter indicates that the inactive list has not been yet polled $P_2$ times and the inactive list is not empty. Otherwise, control passes to block 1726 in which the modems indicated in the out-of-service list are polled using CSMA/CA techniques during an interval of pre-selected duration $I_3$ and any modems that respond with data are moved to the active list and any modems that respond but without data are moved to the inactive list. Following block 1726, control is returned to block 1714.

Figure 18:
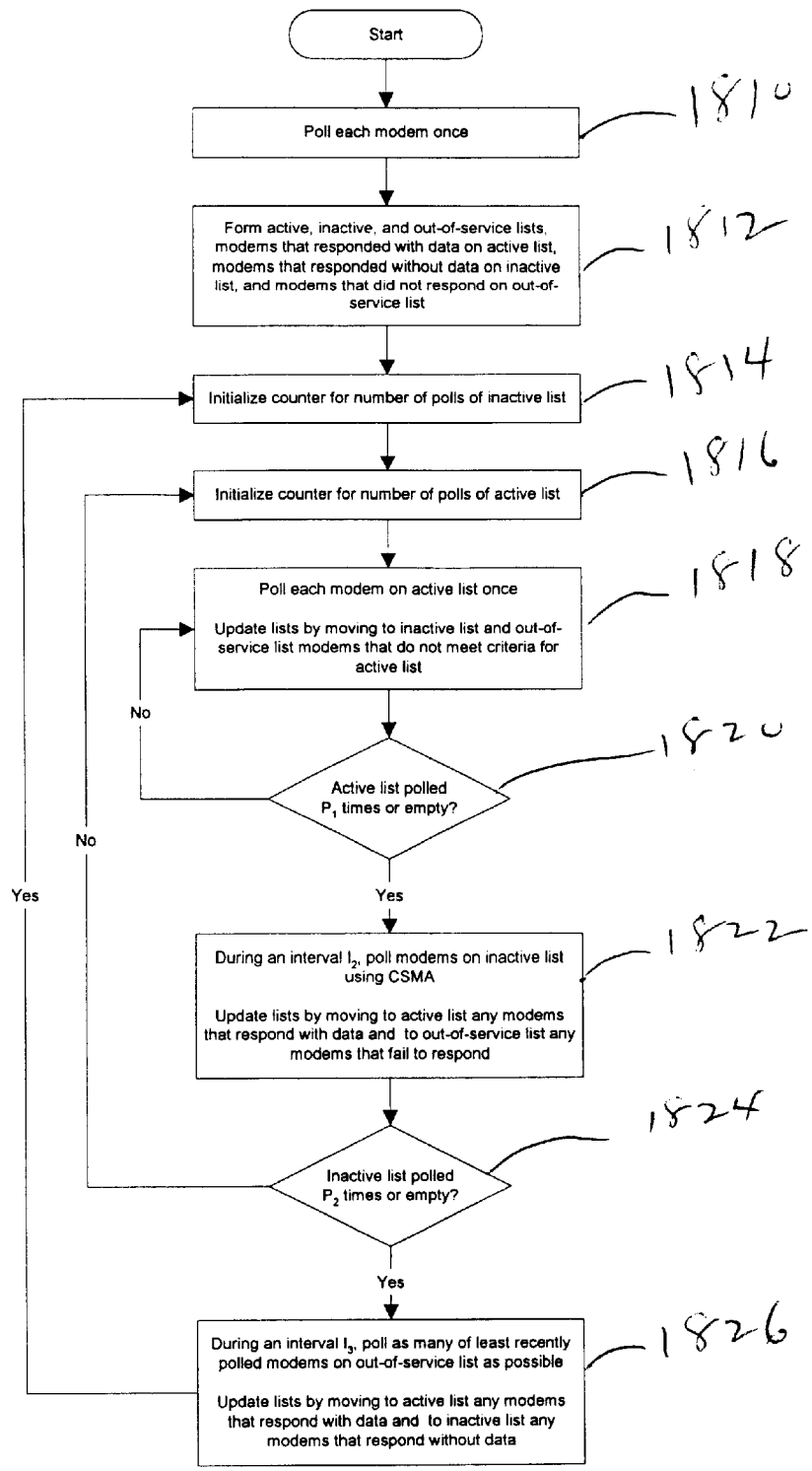

At block 1810 of FIG. 18, each modem is polled and at block 1812, active, inactive, and out-of-service lists are initialized as described in relation to block 1012 of FIG. 10. Then, at blocks 1814 and 1816 counters for the number of polls of the inactive list and the active list, respectively, are initialized and then a loop comprised of blocks 1818 and 1820 is used to poll all of the modems indicated in the active list $P_1$ times. In block 1818 each modem indicated in the active list is polled once and any modems that do not respond or respond with no data are moved to the inactive list or the out-of-service list, as appropriate. Following block 1818, the counter for number of polls of the active list is tested in block 1820 and control returned to block 1818 if the counter indicates that the active list has not been yet polled $P_1$ times and the active list is not empty. Otherwise, control passes to block 1822 in which in which the modems indicated in the inactive list are polled using CSMA/CA techniques during an interval of pre-selected duration $I_2$ and any modems that respond with data are moved to the active list and any modems that do not respond are moved to the out-of-service list. Following block 1822, the counter for number of polls of the inactive list is tested in block 1824 and control returned to block 1816 if the counter indicates that the inactive list has not been yet polled $P_2$ times and the inactive list is not empty. Otherwise, control passes to block 1826 in which as many as possible of the least recently polled modems indicated in the out-of-service list are polled during an interval of pre-selected duration $I_3$ and any modems that respond with data are moved to the active list and any modems that respond but without data are moved to the inactive list. Following block 1826, control is returned to block 1814.

What is claimed is:

1. A method for polling a plurality of wireless modems from a base station, comprising:
   polling each modem at least once;
   forming two lists such that each modem is identified on only one discrete list,
      a first list identifying modems each of which responded the last time that it was polled by sending data back to the base station; and
      a second list identifying modems each of which either
         responded the last time that it was polled with a response that did not include sending data back to the base station, or
         did not respond at all the last time that it was polled, and
   thereafter,
      alternating
         polling all of the modems identified on the first list a first preselected number of times with
         polling all of the modems identified on the second list a second pre-selected number of times,
      while updating the lists based upon the behavior of the modems in response to the last polling so that
         the first list identifies modems each of which responded the last time that it was polled by sending data back to the base station and
         the second list identifies modems each of which either
            responded the last time that it was polled with a response that did not include sending data back to the base station, or
            did not respond at all the last time that it was polled.

2. A method for polling a plurality of wireless modems from a base station, comprising:
   polling each modem at least once;
   forming two lists such that each modem is identified on only one discrete list,
      a first list identifying modems each of which responded the last time that it was polled by sending data back to the base station; and a second list identifying modems each of which either
responded the last time that it was polled with a
response that did not include sending data back to
the base station, or
did not respond at all the last time that it was polled,
and
thereafter,
alternating
polling all of the modems identified on the first list
a pre-selected number of times with
polling modems identified on the second list during
intervals of a pre-selected duration during which
as many of the least recently polled modems
identified on the second list as possible are polled,
while updating the lists based upon the behavior of the
modems in response to the last polling so that
the first list identifies modems each of which
responded the last time that it was polled by
sending data back to the base station and
the second list identifies modems each of which
either
responded the last time that it was polled with a
response that did not include sending data back
to the base station, or
did not respond at all the last time that it was
polled.

3. A method for polling a plurality of wireless modems from a base station, comprising:
polling each modem at least once;
forming two lists such that each modem is identified on only one discrete list,
a first list identifying modems each of which responded the last time that it was polled by sending data back to the base station; and
a second list identifying modems each of which either
responded the last time that it was polled with a response that did not include sending data back to the base station, or
did not respond at all the last time that it was polled,
and
thereafter,
alternating
polling all of the modems identified on the first list a pre-selected number of times with
polling modems identified on the second list during intervals of a pre-selected duration using contention sensing multiple access by transmitting a request to all of the modems on the second list for a response during each interval of the pre-selected duration,
while updating the lists based upon the behavior of the modems in response to the last polling so that
the first list identifies modems each of which responded the last time that it was polled by sending data back to the base station and
the second list identifies modems each of which either
responded the last time that it was polled with a response that did not include sending data back to the base station, or
did not respond at all the last time that it was polled.

4. A method for polling a plurality of wireless modems from a base station, comprising:
polling each modem at least once;
forming three lists such that each modem is identified on only one discrete list,
an active list identifying modems each of which responded the last time that it was polled by sending data back to the base station; and
an inactive list identifying modems each of which responded the last time that it was polled with a response that did not include sending data back to the base station, and
an out-of-service list identifying modems each of which did not respond at all the last time that it was polled, and
thereafter,
polling the modems identified on the active list a pre-selected first number of times for each time that the modems identified on the inactive list and polling the modems identified on the inactive list a pre-selected first number of times for each time that the modems identified on the out-of-service list,
while updating the lists based upon the behavior of the modems in response to the last polling so that
the active list identifies modems each of which responded the last time that it was polled by sending data back to the base station; and
the inactive list identifies modems each of which responded the last time that it was polled with a response that did not include sending data back to the base station, and
the out-of-service list identifies modems each of which did not respond at all the last time that it was polled.

5. The method of claim 4, wherein each time a modem identified on a list is polled all modems identified on that list are individually polled once before modems identified on that list or on another list are polled again.

6. The method of claim 4, wherein
each time a modem identified on the active list is polled all modems identified on that list are individually polled once before modems identified on that list or on another list are polled again; and
each time a modem identified on the inactive list is polled all modems identified on that list are individually polled once before modems identified on that list or on another list are polled again.

7. The method of claim 6, wherein modems identified on the out-of-service list are polled during intervals of pre-selected duration during which as many of the least recently polled modems identified on the out-of-service list as possible are polled.

8. The method of claim 6, wherein modems identified on the out-of-service list are polled during intervals of pre-selected duration using contention sensing multiple access by transmitting a request to all of the modems on the out-of-service list for a response during each interval of pre-selected duration.

9. The method of claim 4, wherein
each time a modem identified on the active list is polled all modems identified on that list are individually polled once before modems identified on that list or on another list are polled again; and
each time a modem identified on the out-of-service list is polled all modems identified on that list are individually polled once before modems identified on that list or on another list are polled again.

10. The method of claim 9, wherein modems identified on the inactive list are polled during intervals of pre-selected duration during which as many of the least recently polled modems identified on the inactive list as possible are polled.

11. The method of claim 9, wherein modems identified on the inactive list are polled during intervals of pre-selected duration using contention sensing multiple access by transmitting a request to all of the modems on the inactive list for a response during each interval of pre-selected duration.

12. The method of claim 4, wherein
each time a modem identified on the active list is polled all modems identified on that list are individually polled once before modems identified on that list or on another list are polled again.

13. A method for polling a plurality of wireless modems from a base station, comprising:
polling each modem at least once;
forming three lists such that each modem is identified on only one discrete list,
an active list identifying modems each of which responded the last time that it was polled by sending data back to the base station,
an inactive list identifying modems each of which responded the last time that it was polled with a response that did not include sending data back to the base station, and
an out-of-service list identifying modems each of which did not respond at all the last time that it was polled; and
thereafter,
alternating
polling all of the modems identified on the active list a pre-selected number of times with
either or both of
polling modems identified on the inactive list during at least one interval of a first pre-selected duration during which as many of the least recently polled modems identified on the inactive list as possible are polled and
polling modems identified on the out-of-service list during at least one interval of a second pre-selected duration during which as many of the least recently polled modems identified on the out-of-service list as possible are polled,
while updating the lists based upon the behavior of the modems in response to the last polling so that
the active list identifies modems each of which responded the last time that it was polled by sending data back to the base station,
the inactive list identifies modems each of which responded the last time that it was polled with a response that did not include sending data back to the base station, and
the out-of-service list identifies modems each of which did not respond at all the last time that it was polled.

14. A method for polling a plurality of wireless modems from a base station, comprising:
polling each modem at least once;
forming three lists such that each modem is identified on only one discrete list,
an active list identifying modems each of which responded the last time that it was polled by sending data back to the base station,
an inactive list identifying modems each of which responded the last time that it was polled with a response that did not include sending data back to the base station, and
an out-of-service list identifying modems each of which did not respond at all the last time that it was polled; and
thereafter,
alternating
polling all of the modems identified on the active list a pre-selected number of times with
either or both of
polling modems identified on the inactive list during at least one interval of a first pre-selected duration during which as many of the least recently polled modems identified on the inactive list as possible are polled and
polling modems identified on the out-of-service list during at least one interval of a second pre-selected duration using contention sensing multiple access by transmitting a request to all of the modems identified on the out-of-service list for a response during each interval of the second pre-selected duration,
while updating the lists based upon the behavior of the modems in response to the last polling so that
the active list identifies modems each of which responded the last time that it was polled by sending data back to the base station,
the inactive list identifies modems each of which responded the last time that it was polled with a response that did not include sending data back to the base station, and
the out-of-service list identifies modems each of which did not respond at all the last time that it was polled.

15. A method for polling a plurality of wireless modems from a base station, comprising:
polling each modem at least once;
forming three lists such that each modem is identified on only one discrete list,
an active list identifying modems each of which responded the last time that it was polled by sending data back to the base station, and
an inactive list identifying modems each of which responded the last time that it was polled with a response that did not include sending data back to the base station,
an out-of-service list identifying modems each of which did not respond at all the last time that it was polled; and
thereafter,
alternating
polling all of the modems identified on the active list a pre-selected number of times with
either or both of
polling modems identified on the inactive list during at least one interval of a first pre-selected duration using contention sensing multiple access by transmitting a request to all of the modems identified on the inactive list for a response during each interval of the second preselected duration and
polling modems identified on the out-of-service list during at least one interval of a second pre-selected duration using contention sensing multiple access by transmitting a request to all of the modems identified on the out-of-service list for a response during each interval of the second pre-selected duration,
while updating the lists based upon the behavior of the modems in response to the last polling so that
the active list identifies modems each of which responded the last time that it was polled by sending data back to the base station, the inactive list identifies modems each of which responded the last time that it was polled with a response that did not include sending data back to the base station, and the out-of-service list identifies modems each of which did not respond at all the last time that it was polled.

16. A method for polling a plurality of wireless modems from a base station, comprising:

polling each modem at least once;

forming three lists such that each modem is identified on only one discrete list,
- an active list identifying modems each of which responded the last time that it was polled by sending data back to the base station,
- an inactive list identifying modems each of which responded the last time that it was polled with a response that did not include sending data back to the base station, and
- an out-of-service list identifying modems each of which did not respond at all the last time that it was polled; and thereafter,
alternating
polling all of the modems identified on the active list a pre-selected number of times with either or both of
- polling modems identified on the inactive list during at least one interval of a first pre-selected duration using contention sensing multiple access by transmitting a request to all of the modems identified on the inactive list for a response during each interval of the second pre-selected duration and
- polling modems identified on the out-of-service list during at least one interval of a second pre-selected duration during which as many of the least recently polled modems identified on the out-of-service list as possible are polled, while updating the lists based upon the behavior of the modems in response to the last polling so that
- the active list identifies modems each of which responded the last time that it was polled by sending data back to the base station,
- the inactive list identifies modems each of which responded the last time that it was polled with a response that did not include sending data back to the base station, and
- the out-of-service list identifies modems each of which did not respond at all the last time that it was polled.

\* \* \* \* \*